United States Patent
Benhase et al.

(10) Patent No.: US 8,880,835 B2
(45) Date of Patent: Nov. 4, 2014

(54) ADJUSTING LOCATION OF TIERED STORAGE RESIDENCE BASED ON USAGE PATTERNS

(75) Inventors: Michael T. Benhase, Tucson, AZ (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 12/498,424

(22) Filed: Jul. 7, 2009

(65) Prior Publication Data

US 2011/0010514 A1  Jan. 13, 2011

(51) Int. Cl.
*G06F 12/16* (2006.01)
*G06F 11/34* (2006.01)
*G06F 3/06* (2006.01)

(52) U.S. Cl.
CPC ............ *G06F 11/3485* (2013.01); *G06F 3/061* (2013.01); *G06F 3/0649* (2013.01); *G06F 3/0688* (2013.01); *G06F 2201/88* (2013.01)
USPC ............................ 711/170; 711/165; 707/651

(58) Field of Classification Search
USPC ......................................................... 711/117
See application file for complete search history.

(56) References Cited

U.S. PATENT DOCUMENTS

| | | | |
|---|---|---|---|
| 5,506,986 A * | 4/1996 | Healy | 711/111 |
| 5,671,388 A | 9/1997 | Hasbun | |
| 5,813,000 A | 9/1998 | Furlani | |
| 5,893,139 A * | 4/1999 | Kamiyama | 711/117 |
| 6,339,793 B1 | 1/2002 | Bostian et al. | |
| 6,487,638 B2 | 11/2002 | Dawkins et al. | |
| 7,062,624 B2 | 6/2006 | Kano | |
| 7,155,593 B2 | 12/2006 | Kano | |
| 7,281,109 B2 | 10/2007 | Kano | |
| 7,634,585 B2 | 12/2009 | Conley et al. | |

(Continued)

FOREIGN PATENT DOCUMENTS

| | | |
|---|---|---|
| EP | 0 670 543 A1 | 9/1995 |
| EP | 0 709 765 A2 | 5/1996 |

(Continued)

OTHER PUBLICATIONS

"Silicon Motion's hybrid SLC/MLC SSD controller", Yahoo! Message Boards, posted on Jun. 24, 2008, http://messages.finance.yahoo.com/Stocks_(A_to_Z)/Stocks_S/threadview?m=tm&bn=22578&tid=10968&mid=10968&tof=18&off=1, 3 pages.

(Continued)

*Primary Examiner* — Kaushikkumar Patel
(74) *Attorney, Agent, or Firm* — Stephen J. Walder, Jr.; Randall J. Bluestone

(57) ABSTRACT

Mechanisms for managing data segments in a tiered storage system are provided. The mechanisms maintain at least one counter for each data segment in the tiered storage system. Each counter in the at least one counter counts a number of access operations to a corresponding data segment for a predetermined time interval. The mechanisms further perform one or more analytical operations based on one or more values of the at least one counter for each data segment to make residence determinations for each data segment. The mechanisms also adjust a storage location of one or more data segments in tiers of the tiered storage system to thereby move the one or more data segments to appropriate tiers of the tiered storage system based on results of the one or more analytical operations.

20 Claims, 6 Drawing Sheets

(56) References Cited

U.S. PATENT DOCUMENTS

| | | | |
|---|---|---|---|
| 2002/0103975 A1* | 8/2002 | Dawkins et al. | 711/133 |
| 2005/0268062 A1* | 12/2005 | Nagase et al. | 711/167 |
| 2006/0004820 A1* | 1/2006 | Claudatos et al. | 707/101 |
| 2006/0010169 A1 | 1/2006 | Kitamura | |
| 2006/0069862 A1 | 3/2006 | Kano | |
| 2006/0143419 A1 | 6/2006 | Tulyani | |
| 2006/0195659 A1 | 8/2006 | Kano | |
| 2006/0236061 A1* | 10/2006 | Koclanes | 711/170 |
| 2006/0259728 A1 | 11/2006 | Chandrasekaran et al. | |
| 2007/0118710 A1 | 5/2007 | Yamakawa et al. | |
| 2007/0136397 A1* | 6/2007 | Pragada et al. | 707/204 |
| 2007/0198797 A1 | 8/2007 | Kavuri et al. | |
| 2007/0208788 A1* | 9/2007 | Chakravarty et al. | 707/204 |
| 2007/0239747 A1* | 10/2007 | Pepper | 707/101 |
| 2007/0239927 A1 | 10/2007 | Rogers et al. | |
| 2007/0260834 A1 | 11/2007 | Kavuri et al. | |
| 2007/0299959 A1 | 12/2007 | Penny et al. | |
| 2008/0021859 A1 | 1/2008 | Berkhin et al. | |
| 2008/0109629 A1* | 5/2008 | Karamcheti et al. | 711/170 |
| 2008/0126680 A1 | 5/2008 | Lee et al. | |
| 2008/0158958 A1 | 7/2008 | Sokolov et al. | |
| 2009/0112879 A1 | 4/2009 | Oliveira et al. | |
| 2010/0122050 A1 | 5/2010 | Hutchison et al. | |
| 2010/0199036 A1* | 8/2010 | Siewert et al. | 711/112 |
| 2010/0281230 A1* | 11/2010 | Rabii et al. | 711/165 |
| 2011/0063748 A1 | 3/2011 | Song et al. | |
| 2011/0213916 A1 | 9/2011 | Fujibayashi et al. | |
| 2012/0203996 A1 | 8/2012 | Anderson et al. | |

FOREIGN PATENT DOCUMENTS

| | | |
|---|---|---|
| JP | 2007-193441 | 8/2007 |
| JP | 2008-47156 A | 2/2008 |
| JP | 2011-003060 | 1/2011 |
| KR | 100801015 B1 | 2/2008 |
| WO | WO 2007/009910 A2 | 1/2007 |
| WO | WO 2008/007348 A1 | 1/2008 |

OTHER PUBLICATIONS

Chang, Li-Pin, "Hybrid Solid State Disks: Combining Heterogeneous NAND Flash in Large SSDs", ASPDAC 2008, http://mm.aspdac.com/aspdac2008/Archive_Folder/5B_Slides/5B-1.pdf, 26 pages.

Schmid, Patrick, "Apacer Mixes Fast SLC with MLC Flash on a Single Drive", Tom's Hardware, Jun. 4, 2008, http://www.tomshardware.com/news/FlashSSD-SLC-MLC,5571.html, 2 pages.

U.S. Appl. No. 13/455,183, 1 page.

"Disk spin-down: Power savings with a catch", SearchStorage.com, http://searchstorage.techtarget.com/feature/Disk-spin-down-Power-savings-with-a-catch, Jul. 2010, 3 pages.

"MAID (massive array of idle disks)", Definition from Whatis.com, http://searchstorage.techtarget.com/definition/MAID, accessed on Apr. 12, 2012, 3 pages.

Schulz, Greg , "The Many Faces of MAID Storage Technology", StorageIO, http://www.storageio.com/Reports/StorageIO_WP_Dec11_2007.pdf, Dec. 11, 2007, 4 pages.

Office Action mailed Nov. 5, 2013 for U.S. Appl. No. 13/455,183; 30 pages.

Otoo, Ekow et al., "Dynamic Data Reorganization for Energy Savings in Disk Storage Systems", Proceedings of the 22nd International Conference on Scientific and Statistical Database Management (SSDBM'10), LNCS 6187, Jun. 30-Jul. 2, 2010, pp. 322-341.

Interview Summary mailed Feb. 6, 2014 for U.S. Appl. No. 13/455,183, 8 pages.

Response to Office Action filed with the USPTO on Feb. 5, 2014 for U.S. Appl. No. 13/455,183, 14 pages.

* cited by examiner

ADJUSTING LOCATION OF TIERED STORAGE RESIDENCE BASED ON USAGE PATTERNS

BACKGROUND

The present application relates generally to an improved data processing apparatus and method and more specifically to a mechanism for adjusting the location of data in a tiered storage system based on an examination of data usage patterns.

Traditional storage models recognize two separate types of storage devices: online storage devices and offline storage devices. Online storage devices typically store transactional data requiring high availability, instant access, and steadfast reliability. Offline storage devices typically store archival data that is infrequently accessed and is stored for long periods of time. However, in the modern environment, data use has expanded beyond simple transactional and archival use. Thus, the concept of tiered storage systems has been introduced.

The concept of tiered storage is based on the varying performance of storage devices as well as the varying demands on performance of these storage devices from the various workloads encountered. Tiered storage involves having multiple logical and physical levels of storage devices based on the performance capabilities and costs of the storage devices and then storing data in these various levels of storage devices based on the expected demand for that data and the corresponding performance of the storage devices in that level of the tiered storage system.

Thus, for example, at a highest level of the tiered storage system, a plurality of storage devices having very high performance capabilities is provided. These storage devices are utilized in the tiered storage system with data that is expected to be required frequently and with minimal access delay. This tier of the tiered storage system is sometimes referred to as the "online" tier or T0. This tier will usually consist of storage devices which are the most expensive to manufacture and purchase.

A middle tier of the tiered storage system, sometimes referred to as the "nearline" tier or T1, has storage devices that have a lower performance capability than the highest level of the tiered storage system but still have sufficient performance to handle accesses to data that are accessed on a regular basis but not as often as the data stored in the highest tier or whose access can tolerate larger access delays due to lower performance measures of the storage devices in this middle tier of the tiered storage system. There may be multiple middle tiers in a tiered storage system based on the complexity of the tiered storage system and the differing performance capabilities of the storage devices employed.

A bottom tier of the tiered storage system, sometimes referred to as the "offline" tier, may be comprised of relatively low performance storage devices. This tier is often used to archive data or store data that is infrequently accessed and thus, the access delay associated with these storage devices is not of a concern.

The reason to implement such tiered storage systems is not only based on the various demands for storage device performance by the workloads in today's computing environments, but also on the cost of such storage devices. Costs of storage devices are proportional to the performance of the storage device. That is, higher performance storage devices cost considerably more than lower performance storage devices. As a result, it is less costly to have a large number of lower performance storage devices than to have a large number of high performance storage devices. As a result, in a tiered storage system, a relatively smaller set of high performance storage devices may be used to handle data requiring high availability and instant access. Meanwhile, a relatively larger set of lower performance storage devices may be used to store data for archival purposes or for infrequently accessed data. A middle sized set of intermediately performing storage devices can be used to handle data requiring regular access. As a result, the cost of the storage system may be minimized while still accommodating the workload demands using a tiered approach.

SUMMARY

In one illustrative embodiment, a method, in a data processing system, is provided for managing data segments in a tiered storage system. The method comprises maintaining, in the data processing system, at least one counter for each data segment in the tiered storage system. Each counter in the at least one counter counts a number of access operations to a corresponding data segment for a predetermined time interval. The method further comprises performing, by the data processing system, one or more analytical operations based on one or more values of the at least one counter for each data segment to make residence determinations for each data segment. The method also comprises adjusting, in the tiered storage system, a storage location of one or more data segments in tiers of the tiered storage system to thereby move the one or more data segments to appropriate tiers of the tiered storage system based on results of the one or more analytical operations.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
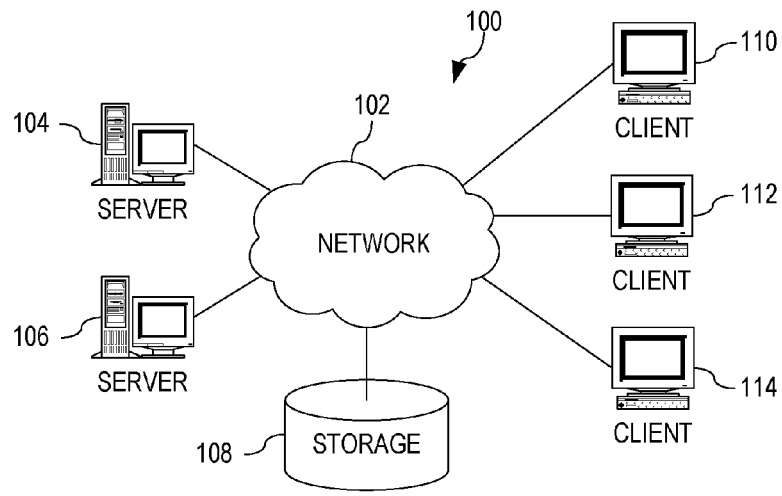
FIG. 1 is an example pictorial representation of a distributed data processing system in which aspects of the illustrative embodiments may be implemented.

The illustrative embodiments provide a mechanism for adjusting the location of data in a tiered storage system based on an examination of data usage patterns. Tiered storage systems today rely on manual means and policies to determine the placement or residence of data sets within the tiered structure. That is, typically a system administrator must recognize which data sets should be in which tiers of a tiered storage system and then manually perform the reorganization of the data sets so that the data sets are in the tiers most suited for them. A system administrator may make use of some tools to help in this process, such as a tool to locate "hot" logical unit numbers (LUNs) so that the system administrator may then manually migrate these LUNs to tiers which can better handle the increased activities. However, there are no mechanisms for automatically adjusting the location of data sets within tiered storage based on an examination of usage patterns.

With the mechanisms of the illustrative embodiments, all data in a tiered storage system is segmented into relatively small but manageable chunks, referred to as segments. Counters are maintained for each of these segments. When a segment's access density exceeds a threshold, T+, the segment is dynamically moved from a lower tier to a higher tier in the storage system, if a higher tier is available. If the access density drops below another threshold, T−, then the segment is demoted or dynamically moved to a lower tier in the storage system. Counters are used which bias recent activity and the thresholds are dynamically tuned to try and keep the highest tiers of the storage system as full as possible. Moreover, these counters are used to keep the access density of the highest tier as high as possible, where access density is the mean accesses per unit amount of storage, e.g., accesses per GB. Ideally the N data segments residing in the highest tier, T0, should be the N most accessed segments in the tiered storage system.

In addition to counters for each segment, counters may be utilized for each storage device within one or more tiers of the storage system, e.g., only the top tier of the storage system, all tiers of the storage system, or the like, so as to keep measures of the number of operations per second for each storage device, maximum operations for each storage device in the one or more tiers. Other counters may also be utilized with storage level controllers for identifying maximum and actual numbers of operations handled by these controllers. From this information projected operations per second may be calculated and used in decisions as to where to locate data in the tiers of the storage system. Based on the projected operations per second of the segments of data that are to be moved as well as the projected operations per second of the controllers and storage devices to which the data segments are to be moved, a determination can be dynamically and automatically made as to the best location within the tiered storage system for the data segments.

In some illustrative embodiments, the values of the counters may be maintained in association with a BTree or other searchable data structure representative of the tiered storage system. The values of the counters may be maintained for increments of time greater than a time it takes to move data between tiers of the storage system. This searchable data structure may then be used to perform a variety of background analytical operations to create policies to be applied to the data segments stored in the tiered storage system. Such policies may initiate tasks to promote and demote data segments at particular times or when other segments are promoted or demoted, for example. Additional details of each of these mechanisms of the illustrative embodiments will be set forth hereafter.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), a storage area network (SAN), or the connection may be made to an external computer (for example, through the Internet using an Internet Service Provider). Moreover, the program code may be run in an external storage system which contains computers such as servers or customized or specialized hardware.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
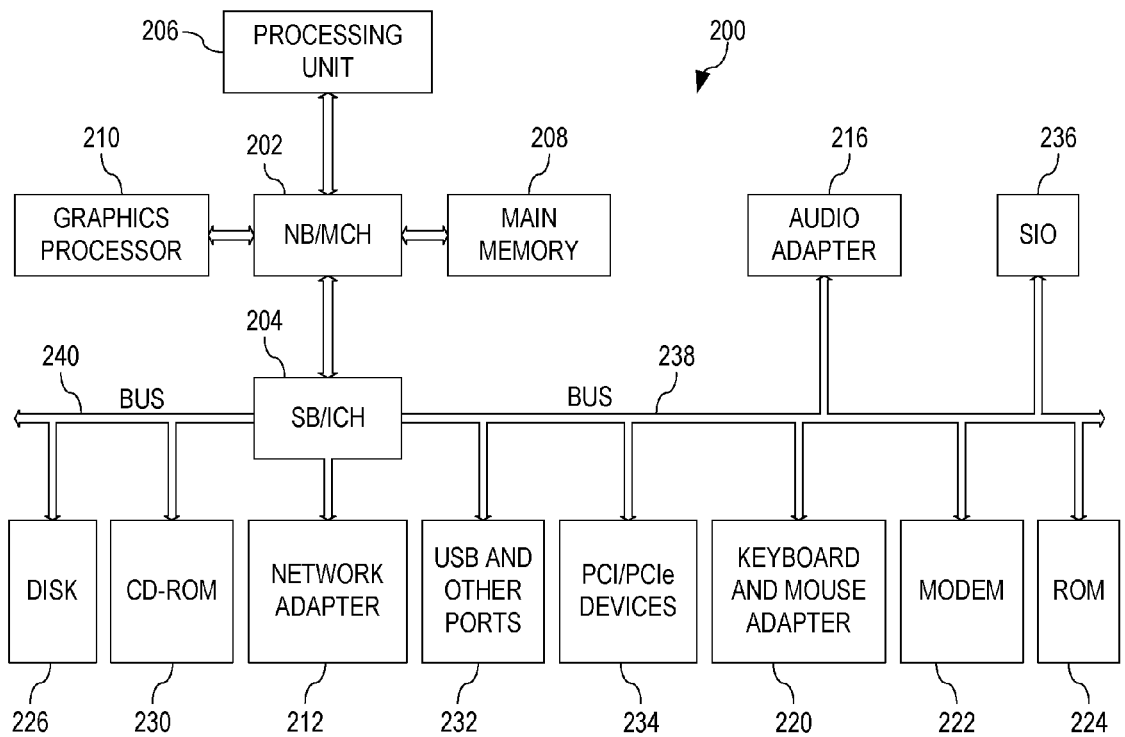
FIG. 2 is an example block diagram of a data processing device in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a tiered storage system in a distributed data processing system implementation this is only an example and is not intended to state or imply any limitation with regard to the features of the present invention. To the contrary, the illustrative embodiments are intended to include single data processing device environments and any other embodiments in which a tiered storage system may be utilized. Moreover, the illustrative embodiments may be implemented in systems having a single server or computer accessing a storage system. The computer may or may not have multiple virtual partitions running on it, such as logical partitions (LPARs).

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. Storage unit 108 may be any type of storage unit or storage system. Examples of storage unit 108 may include an advanced storage device, such as a DS8000 dual node controller, or a file server, such as a network attached storage (NAS) device.

In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. The illustrative embodiments are also particularly well suited for implementation with networks, such as SANs, where the wires and switches utilize Fibre Channel, iSCSI, FCOCEE, or the like technologies. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed. Moreover, in one illustrative embodiment, the data processing system 200 may be comprised of one or more System p servers with a network of host adapters to communicate over the network 102 in FIG. 1, and a network of RAID adapters to communicate to a plethora of storage devices.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

With regard to the illustrative embodiments, one or more of the data processing systems and/or storage systems may include a tiered storage system upon which the mechanisms of the illustrative embodiments may be implemented. The illustrative embodiments operate to optimize the location of data segments within a tiered storage system so as to make efficient use of the varying performance characteristics of the various tiers of storage devices within the tiered storage system.

Figure 3:
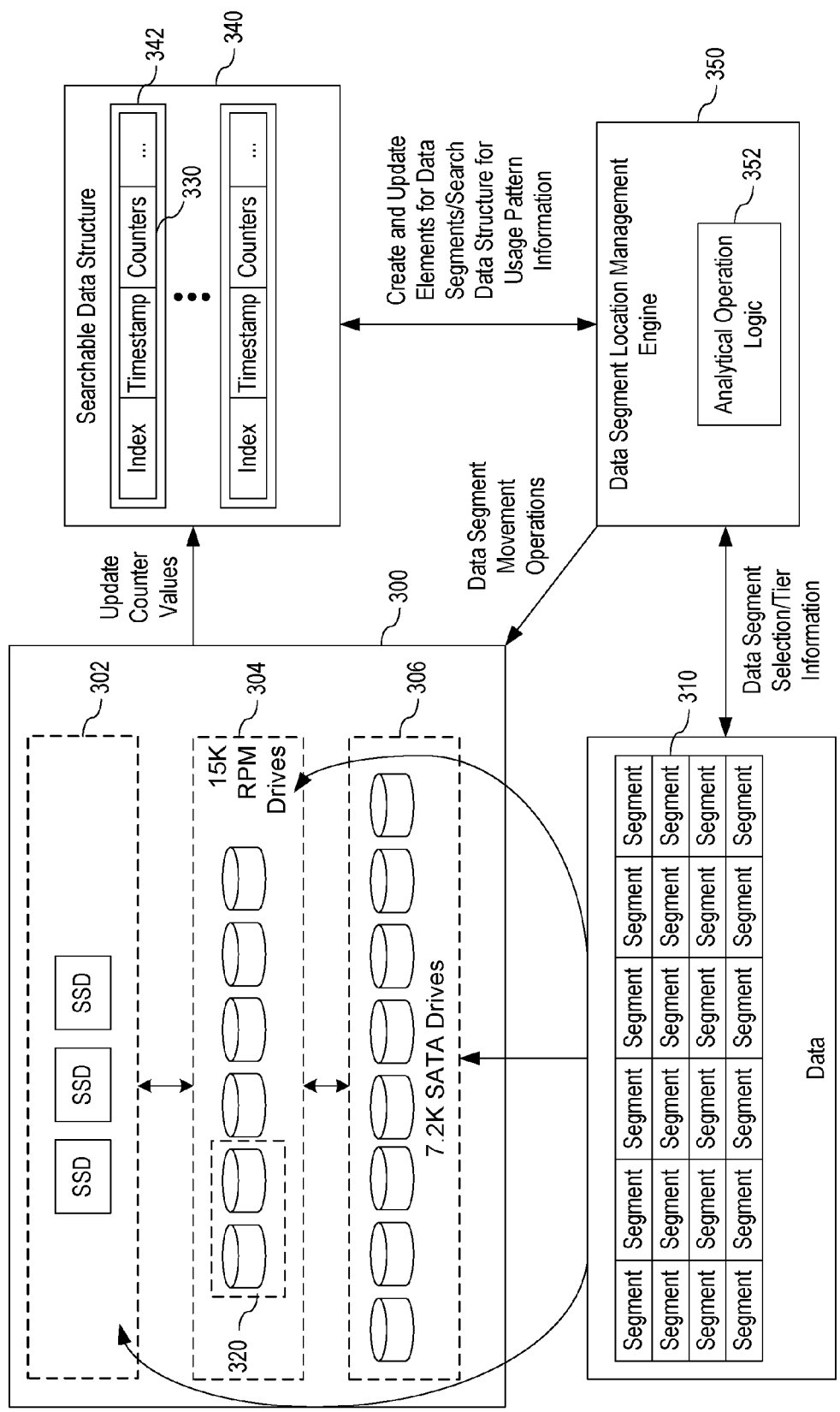
FIG. 3 is an example logical diagram of a tiered storage system in accordance with one illustrative embodiment.

FIG. 3 is an example logical diagram of a tiered storage system in accordance with one illustrative embodiment. The tiered storage system in FIG. 3 may be implemented in a distributed data processing system or single data processing device, for example. The storage devices of the tiered storage system may be part of the network attached storage unit 108, for example, may be associated with one or more server computing devices, such as servers 104 and 106 in FIG. 1, or may be part of, or associated with, a client computing device, such as client computers 110-114. Thus, the tiered storage system may be part of a stand-alone computer, associated with a client computer, associated with a server, or may be part of a network attached storage system. In one illustrative embodiment, network 102 may be a SAN with storage unit 108 being an external block oriented device or a network of block oriented storage devices controlled by a virtual SAN controller, such as SAN Volume Controller™ (SVC), available from International Business Machines Corporation of Armonk, N.Y.

Storage devices of individual tiers within the tiered storage system may be associated with different computing devices from storage devices of other tiers in the tiered storage system. Thus, for example, the storage devices of a first tier may be associated with a first storage system or server and the storage devices of a second tier may be associated with a second storage system or server. Moreover, the storage devices of the tiers may simply be different types of storage devices controlled by an external storage controller device. For example, some of the storage devices may comprise a first enclosure of solid state disks (SSDs), a second enclosure of 15K hard disks (HDDs), and third enclosure of 7.2K HDDs, and a set of tape drives, all controlled by one or more external storage controller devices. Any combination of computing devices and tiers of the tiered storage system is intended to be within the spirit and scope of the illustrative embodiments.

As shown in FIG. 3, the tiered storage system 300 is comprised of a plurality of tiers 302-306 of storage devices with each tier having storage devices with similar performance characteristics. Between tiers, the storage devices have differing performance characteristics. With the illustrative embodiments, storage devices having relatively higher performance characteristics, e.g., number of operations per second, access latency, etc., are placed in higher tiers while storage devices having relatively lower performance characteristics are placed in lower tiers of the tiered storage system 300. Storage devices in higher tiers are able to perform a relatively larger number of read and write operations per second than those on lower tiers. For example, an SSD in the highest tier, T0, may be able to perform 50,000 read operations and 15,000 write operations per second while a storage device in a middle tier, T1, may only be able to perform 300 read or write operations per second. Storage devices in a lowest tier, T2, may only be able to perform 100 read or write operations per second. With the latency metric, i.e. the time it takes to get the data back from storage or to store the data to storage, T0 storage devices may take 250 µs while T1 storage devices may take 5 ms and T2 storage devices may take 10 ms. Moreover, additional tiers that may be powered off, such as tape storage devices, may take many seconds to obtain data from the storage device or store data to the storage device.

In the depicted example, the tiered storage system 300 has three tiers 302-306 with the highest tier 302 having highest relative performance characteristics, the lowest tier 306 having the lowest relative performance characteristics, and the middle tier 304 having an intermediate level of performance characteristics. As an example, the lowest performance characteristic storage devices of the lowest tier 306 may comprise relatively slow access time hard disks, magnetic tape storage devices, or the like. The highest tier 302 may be comprised of relatively high speed hard disks and the middle tier 304 may be comprised of intermediate level speed hard disks. In one illustrative embodiment, the highest tier 302 is actually comprised of one or more solid state disks (SSDs). An SSD is a data storage device that uses solid-state memory to store persistent data. SSDs emulate hard drive interfaces thereby easily replacing hard drives in most applications. An SSD using SRAM or DRAM (instead of flash memory) is often referred to as a RAM-drive.

In one illustrative embodiment, data in the tiered storage system is segmented into relatively small but manageable chunks, referred to as data segments 310. In a Small Computer System Interface (SCSI) implementation of the tiered storage system 300, a logical unit number (LUN) 320 of a storage device in a tier 302-306 of the tiered storage system 300 may be comprised of a plurality of these data segments 310. Thus, in a tiered storage system, the LUNs 320 may be spread over multiple storage devices. For example, a LUN 320 may be striped over many storage devices and further broken down into segments. The segments of that LUN 320 may move around to the different tiers based on access usage patterns. A LUN may be many Terra Bytes in size whereas a data segment may be relatively small, such as 10 MB. In other implementations, rather than using LUNs, other logical representations of portions of storage may be utilized, such as volumes (used with mainframe computers), or the like.

The data segments may be of any suitable size with the size being determined, for example, by weighing performance factors such as time required to move data segments of the particular size from one tier to another (which would be larger for segments of larger size), the size of data structures required to manage the segments (which would be larger for segments of smaller size), the probability of moving data into high performance storage systems, as part of the data segment, that is not highly accessed (which is a greater probability with larger segment sizes), the total capacity of a tier in the tiered storage system, and the like. In one illustrative embodiment, taking these and other factors into account, the size of a data segment may be approximately 10 MB. Of course other sizes, including 1 MB, 100 MB, or the like, may be used without departing from the spirit and scope of the illustrative embodiments.

Counters 330 are maintained for each of these data segments 310 to monitor the effective access density of these data segments in each tier. Effective access density is the rate at which the data segment is accessed in the tier in which it resides, over some give period of time. The counters operate for a predetermined time interval to count the number of operations accessing the corresponding data segment for that predetermined time interval. In one illustrative embodiment, the counters 330 may count the number of total operations over the predetermined time interval regardless of whether the operation is a read or write operation. However, in some illustrative embodiments, there may be separate counters for read operations and write operations, such as in embodiments where there are asymmetric access parameters for the two types of operations.

The counters 330 may be reinitialized at the end of monitoring period, which may be longer than the time interval over which the counter performs its counting operations, to continue their counting operation for a time interval in a next monitoring period. For example, a time interval may be a 30 minute time interval, but the monitoring period may be an hour, a day, a week, a month, a year, or the like. Thus, in one illustrative embodiment, the counters provide a measure of the operations per second associated with the corresponding data segment, i.e. the number of operations as identified by the value of the counter divided by the time interval. This measure of operations per second for the specified time interval may be written to a separate data structure for subsequent use or maintained as a counter value in a data structure in which the counter 330 is implemented.

For example, the values of the counters 330 may be maintained in a searchable data structure in association with the data segments. For purposes of the following description, an illustrative embodiment is described in which a Btree data structure 340 is used to maintain the counters 330 for data segments 310 of the tiered storage system 300. A Btree data structure is a tree data structure that keeps data sorted and allows searches, insertions, and deletions in logarithmic amortized time. Unlike self-balancing binary search trees, a Btree is optimized for systems that read and write large blocks (or segments) of data. In a Btree, internal (non-leaf) nodes can have a variable number of child nodes within a pre-defined range. When data is inserted or removed from a node, its number of child nodes changes. In order to maintain the pre-defined range, internal nodes may be joined or split. Because a range of child nodes is permitted, Btrees do not need rebalancing as frequently as other self-balancing search trees. The lower and upper bounds on the number of child nodes are typically fixed for a particular implementation. For example, in a 2-3 Btree (often simply referred to as a 2-3 tree), each internal node may have only 2 or 3 child nodes. A Btree is kept balanced by requiring that all external nodes are at the same depth. This depth will increase slowly as elements are added to the tree, but an increase in the overall depth is infrequent and results in all leaf nodes being one more node further away from the root.

It should be appreciated that while the illustrative embodiments utilize the Btree data structure to provide a searchable data structure for accessing performance information for the individual data segments, the illustrative embodiments are not limited to utilizing a Btree data structure. Rather, any searchable data structure may be utilized for maintaining counter information, and other performance information depending upon the implementation, for use in determining if and how to adjust the location of data segments within a tiered storage system.

A data segment location management engine 350 utilizes the information stored in the searchable data structure 340 to perform background analytical operations to make residence determinations and automatically generate data segment storage policies to be automatically implemented within the tiered storage system 300. The data segment location management engine 350 comprises logic 352, provided either as software instructions, hardware logic, or any combination of software and hardware based logic, to perform the various analytical operations and control movement of data segments between tiers 302-306 of the tiered storage system 300 in response to the results of such analytical operations. Thus, based on these analytical operations and determinations, data segments may be moved from one tier 302-306 to another within the tiered storage system 300 based on whether the effective access density, indicative of usage patterns, and/or other factors indicate that a particular data segment should be promoted or demoted within the tiered storage system 300.

Assuming the use of a Btree searchable data structure, the creation of entries in this Btree and use of the Btree to obtain information about data segments will now be described. As noted above, the data in the tiered storage system 300 is broken up into chunks or segments 310 which, in one illustrative embodiment, have a size of approximately 10 MB. A Btree insertion is performed by the data segment location management engine 350 whenever a 10 MB segment 310 is created or first accessed. The index for the created element, e.g., element 342 in FIG. 3, in the Btree is the starting address of the data segment 310. This index is stored in the element 342 along with a first timestamp of creation of the element. The size of the element 342 in the Btree is such that values of counters may be stored for a predetermined period of time. For example, in one illustrative embodiment, the counters count access operations to a data segment for a time interval of 15 or 30 minutes. The element 342 has a sufficient size to store values for such counters for a calendar year.

For example, a 3 byte counter allows for approximately 16 M counts within a 30 minute interval, i.e. 3 bytes is 24 bits leading to a maximum value stored in the 3 bytes of $2^{**}24-1=16,777,215$. For a 30 minute interval, a maximum value would represent approximately 9,000 operations/second, i.e. 16,777,215/(30*60 seconds)=9,320.675 operations per second. Thus, allowing for a calendar year of counter value storage, with the counter values having 3 bytes and counting for 30 minute time intervals, one would need 52,560 bytes to maintain the counter values. These counters may wrap after the calendar year to allow for additional monitoring from year to year. Adding an additional 4 bytes for the initial timestamp and another 4 bytes for the index pointer results in a size for the element in the Btree of 52,568 bytes. This may be rounded up to 64K to allow for the storage of trend information and other data segment usage information, metadata, or the like, that may be used with analytical operations depending upon the implementation. This is approximately 0.7% overhead (amount of counter data divided by the size of the data segment). If a user wants less overhead, the data segment size may be increased or the predetermined time interval period may be increased.

The counters 330 may be incremented each time there is an access operation to the corresponding data segment for the time interval corresponding to that counter 330. The particular counter value 330 to increment within an element 342 may be determined by a simple comparison of the current timestamp with the initial timestamp. For example, the difference between the timestamps divided by the time interval over which each counter 330 counts is indicative of which 3 byte value within the element should be incremented at the current time. The searchable data structure 340 storing these counters is preferably pageable and cacheable in a disk cache.

The data segment location management engine 350 may perform many different types of analytical operations based on the information stored in the searchable data structure 340. These various analytical operations may be performed as background operations and may be used to automatically make residence decisions for data segments, automatically move data segments based on these residence decisions, as well as automatically generate policies to handle future storage of data segments within tiers 302-306 of the tiered storage system 300. Moreover, these analytical operations may be used to predict when data segments may be likely to be accessed and move the data segments into higher tiers before the higher access time is predicted. These analytical operations may be performed on a continual basis, at periodic times (such as at the end of each time interval), or at the end of the monitoring period before the counters wrap to the next monitoring period, e.g., at the end of the calendar year. These analytical operations may be performed, for example by the analytical operation logic 352, as previously mentioned above.

For example, the data segment location management engine 350 may perform an analytical operation to determine if the distribution of the operations per second for a data segment over a plurality of time intervals is basically uniform, i.e. the data segment has an access density pattern that is relatively unchanged over time. That is, there is not a significant difference between the operations per second of one time interval relative the other time intervals. A data segment with a high uniform access density can be placed in a high speed tier, e.g., tier T0, and left there until the data segment's access pattern changes.

In such a case, the data segment location management engine 350 may compare the operations per second (such as for a most recent time interval or for a particular period of time from a current time), or an average of the operations per second over the time intervals considered, with one or more predetermined thresholds indicative of whether to promote or demote the data segment from a current tier 302-306 of the tiered storage system 300 to another of the tiers 302-306. There may be one or more predetermined thresholds per tier 302-306 such that a different threshold may be used for promotion from a middle tier 304 to a highest tier 302 than a threshold for promotion from a lowest tier 306 to the middle tier 304, for example.

If the operations per second, or average operations per second, meet or exceed a promotion threshold, then the data segment is flagged for promotion to the next higher tier 302-306. If the operations per second, or average operations per second, meet or fall below a demotion threshold, then the data segment may be flagged for demotion to a next lower tier 304-306. If the operations per second, or average operations per second, do not meet, exceed, or fall below these thresholds, but are within a tolerance of the thresholds, then they may be placed on a watch list and monitored for possible demotion or promotion. Data segments on the watch list may be checked on a more frequent basis using such analytical operations to determine if they should be promoted or demoted. If, during these more frequent checks, the operations per second, i.e. access density, meets, exceeds, or falls below one of these thresholds, then the data segment may be removed from the watch list and either promoted or demoted according to the threshold met, exceeded, or fallen below.

The data segment location management engine 350 may further perform analytical operations to determine if there are any data segments that have zero accesses within the time interval(s) considered. Moreover, the data segment location management engine 350 may also identify whether or not there are regularly occurring periods of no accesses, e.g., during the first N days of the month, this data segment is not accessed, so that a corresponding policy may be automatically generated to demote the data segment prior to such period.

For those data segments that have zero accesses within the time interval(s), these data segments may be placed in another watch list, referred to as the zero access watch list, for possible movement to a storage device that can be powered down or moved to a magnetic tape for longer periods of time, e.g., an archival storage device. For data segments that are on the zero access watch list, these data segments may be checked to determine if they do not receive any access operations within an additional predetermined time interval. If the data segments again do not receive any access operations within this additional predetermined time interval, then the data segments may be moved to the archival storage device. Alternatively, the data segments may be placed on a queue of actions to be performed at a specific time in the future, e.g., at time X, move data segment Y to tier 3.

The data segment location management engine 350 may perform further analytical operations for data segments having non-uniform distributions of access operations. For those data segments whose operations per second represent non-uniform distributions with spikes above the predetermined threshold, and the number of these spikes are equal to or greater than a predetermined number of spikes, these data segments may be flagged by the data segment location management engine 350 for promotion to a next higher tier 302-306 of the tiered storage system 300. Similarly, for those data segments whose operations per second represent non-uniform distributions and there are not enough spikes above the predetermined threshold, i.e. the number of spikes is less than the predetermined number of spikes, these data segments are flagged by the data segment location management engine 350 for demotion to a next lower tier 302-306 of the tiered storage system 300.

The data segment location management engine 350 may further perform analytical operations to determine if the operations per second for a plurality of time periods has a substantially linearly increasing or decreasing trend, an exponentially increasing or decreasing trend, or other non-linear trend that may be formulated such that a prediction or extrapolation of operations per second for future time intervals may be made. The formulation of the increase or decrease may be used as a basis for predicting a point at which the operations per second for the data segment will meet or exceed a threshold for promotion of the data segment or meet or fall below a threshold for demotion of the data segment. For example, with a linearly increasing or decreasing trend, the slope of the line approximating the trend may be used to predict or extrapolate operations per second for future time intervals. As a result, the prediction or extrapolation can be used to schedule a movement of the data segment to another tier 302-306 in the tiered storage system 300 in anticipation of the operations per second being of a level where movement of the data segment is warranted.

Additional analytical operations that may be performed by the data segment location management engine 350 include analyzing the operations per second values stored by the counters to identify trends with regard to times of day, times of the week, quarterly trends, monthly trends, yearly trends, and the like. For example, the analytical operations may determine the reoccurrence of spikes up or down in the operations per second at these various time intervals. Based on the detected reoccurrence of these spikes, a policy may be automatically generated to move the data segment up or down in the tiers 302-306 of the tiered storage system 300 in advance of the expected spike. For example, if a spike occurs daily between midnight and 4 AM, then a policy may be automatically generated to more the data segment at 11:45 PM up to a higher tier 302-304 and to move the data segment back down to a lower tier 304-306 at 4:15 AM. Similar data segment movement policies may be automatically established for other time intervals and trends or detected reoccurrences.

Moreover, the data segment location management engine 350 may perform cross segmentation spike analytical operations to determine cross segmentation usage patterns. For example, the relationships between operations-per-second measures for different data segments may be evaluated to identify if there are any reoccurrences of relationships indicative of linked usage patterns between data segments. For example, when a first data segment A has a minor spike, then a second data segment B may have a major spike in operations-per-second on a reoccurring basis. As a result, the data segment location management engine 350 may automatically generate a policy to look for instances where the first data segment A has an operations per second measure that meets or exceeds a certain threshold, e.g., a value indicative of the minor spike, and then automatically promoting the second data segment B in response to the first data segment A's operations per second meeting or exceeding this threshold. In this way, segment B is promoted to a higher tier 302-304 in the tiered storage system 300 prior to the anticipated major spike in the operations per second associated with data segment B.

The determination of such cross segmentation spike relationships may take many different forms. In general, the cross segmentation spike analytical operations look for spikes in usage patterns for data segments where these spikes are a predetermined, or dynamically determined, threshold amount about a normal range, occur repetitively, and have a correlation between them. Thus, for example, the cross segmentation spike analysis may identify a spike in the usage pattern of particular data segment, having a sufficient size as determined by comparing the magnitude of the spike to the threshold, and then may look for spikes in the usage patterns of other data segments within a predetermined time range of the detected spike that are of sufficient size as determined by comparing their magnitudes with either the same or a different threshold amount above a normal range. Such correlated spikes may then be used as candidates for cross segmentation spike analysis to determine if a policy rule for the cross segmentation spike relationship should be generated.

A single instance of a spike in one data segment's usage pattern with a corresponding spike in another data segment's usage pattern is not typically sufficient for the cross segmentation spike analysis of the illustrative embodiments to determine that a policy should be generated. To the contrary, a counter may be associated with each of the identified cross segmentation spike relationships and may be incremented each time the relationship is observed by the analytical operations. Once this counter has a value that meets or exceeds a threshold value, the corresponding cross segmentation spike relationship may be considered for generation of a policy.

Alternatively, the counter value, or other mechanisms, may be used to generate a correlation factor for an identified cross segmentation spike relationship. For example, based on the counter value, a determination may be made that there is a 90% correlation between a first spike in usage pattern of a first data segment and a second spike in usage pattern of a second data segment, i.e. 9 out of 10 instances of the first spike are followed by the second spike within a prescribed time period. If this correlation is above a threshold correlation, indicative of a point at which a policy for the cross segmentation spike relationship should be generated, then a policy is generated for the cross segmentation spike relationship.

The particular threshold at which the policy is to be generated, as well as the threshold above normal usage at which a spike is determined to be of significant size for consideration in cross segmentation spike analysis, may be predetermined or may be dynamically determined based on the current operating conditions of the multi-tier storage system. For example, as the available storage space of a top tier, or middle tier, of the multi-tier storage system decreases, the thresholds may be adjusted higher thereby requiring a greater size spike and/or greater correlation between spikes for such cross segmentation spike relationships to be considered for generation of policy rules or for application of existing policy rules to adjust the movement and placement of data segments in tiers of the multi-tier storage system. This effectively makes it more difficult for data segments to be promoted to the higher tiers of the storage system when available space becomes less abundant. In addition, this reduces the likelihood that data segments already in the higher tiers are demoted to make room for other data segments requiring promotion. Of course other factors may be used to determine when and how to dynamically adjust thresholds without departing from the spirit and scope of the illustrative embodiments.

The policy rules that are generated as a result of this cross segmentation spike analysis may be time dependent or time independent. For example, if the cross segmentation spike analysis determines that every day at 7:45 am there is a spike in data segment A followed by a correlated spike in usage in data segment B, then the resulting policy rule may automatically promote both segment A and segment B at a time of 7:44 am every day in anticipation of the expected spike. Such time dependency may be based on date, time of day, day of the week, or any other time basis. With such time dependent policy rules, the application of the rule to modify the location of a data segment within the multi-tiered storage system is initiated in response to a current time being within a predetermined tolerance of a time associated with the policy rule.

Alternatively, the policy rule may state, for example, that at any time, if a spike in the usage pattern of data segment A is detected, data segment B is to be promoted because there is a correlation between spikes in the usage of data segment A being followed by spikes in data segment B usage. With such time independent policy rules, the application of the rule to modify the location of a data segment within the multi-tiered storage system is initiated in response to the occurrence of a particular condition with regard to a usage pattern of a data segment, e.g., a spike in excess of a certain threshold.

It should be noted that while the above cross segmentation spike analysis is described with regard to spikes meeting or exceeding a predetermined or dynamically determined threshold, these spikes need not be in a positive direction. That is, the spike does not have to be with regard to an increase in usage in the usage pattern for the data segment but instead, may be a negative spike in that usage may drastically decrease. Both positive and negative spikes may be considered as part of the cross segmentation spike analysis with corresponding movement of data segments from lower to higher, or higher to lower, tiers in the multi-tiered storage system.

In addition, while the above cross segmentation spike analysis and resulting policy rules are described in terms of only two data segments, e.g., segment A's relationship with segment B, the illustrative embodiments are not limited to such. Rather, the analysis and resulting policy rules may take into consideration any number of data segments, their corresponding usage patterns, and any spikes that may occur in their usage patterns. Thus, for example, a correlation between a positive spike in the usage pattern of data segment A with a positive spike in the usage pattern of data segment B may be further correlated with a negative spike in the usage pattern of data segment C. As a result, the policy rule may be of the type "If there is a positive spike in data segment A and a positive spike in data segment B, demote data segment C." Any correlations in spike behavior of usage patterns of data segments may be used to generate policy rules without departing from the spirit and scope of the illustrative embodiments.

As a further benefit of the illustrative embodiments, situations may be detected in which data segments may have been promoted but, due to current conditions of the higher tiers of the multi-tiered storage system, such promotion cannot be performed. For example, in some cases, it may be desirable to block the promotion of a data segment if there are already data segments in the higher tiers that have a similar priority. Moreover, there may be instances where the promotion of a data segment cannot be completed due to available space in higher tiers and a desire to not demote other data segments. As a result, a promotion operation may not be performed even though promotion may normally be performed.

Such situations may be detected by the mechanisms of the illustrative embodiments and an appropriate message may be output to a system administrator. The message may indicate the reason why such promotion was not accomplished and may provide suggestions as to how to avoid the blocking of such promotions in the future. For example, the mechanisms of the illustrative embodiments may suggest the addition of storage devices to one or more tiers of the multi-tiered storage system to allow for additional data segments to be promoted.

Other types of analytical operations may be performed in addition to or in replacement of one or more of the above described analytical operations. The analytical operations described above are only intended to be for purposes of illustration of examples of the types of analytical operations that may be performed and are not intended to state or imply any limitations with regard tot the types of analytical operations that may be performed by the data segment location management engine 350.

The above illustrative embodiments utilize counters for each data segment as a mechanism for measuring operations per second for predetermined time intervals and then using these measures to identify access trends, or usage patterns, of the data segments that are indicative of a need to promote or demote the data segment within a tiered storage system. This approach is used as a way of keeping data segments that require high availability at the highest tiers of the tiered storage system, comprised of relatively more costly storage devices, during time periods where accesses to these data segments are expected to be sufficiently high. The number of data segments that are maintained at the higher tiers of the tiered storage system are anticipated to be significantly less than data segments that do not require high availability. Moreover, this approach is used as a way of keeping data segments that do not require high availability at lower tiers of the tiered data storage system where the data may be stored on relatively lower cost storage devices.

Figure 4:
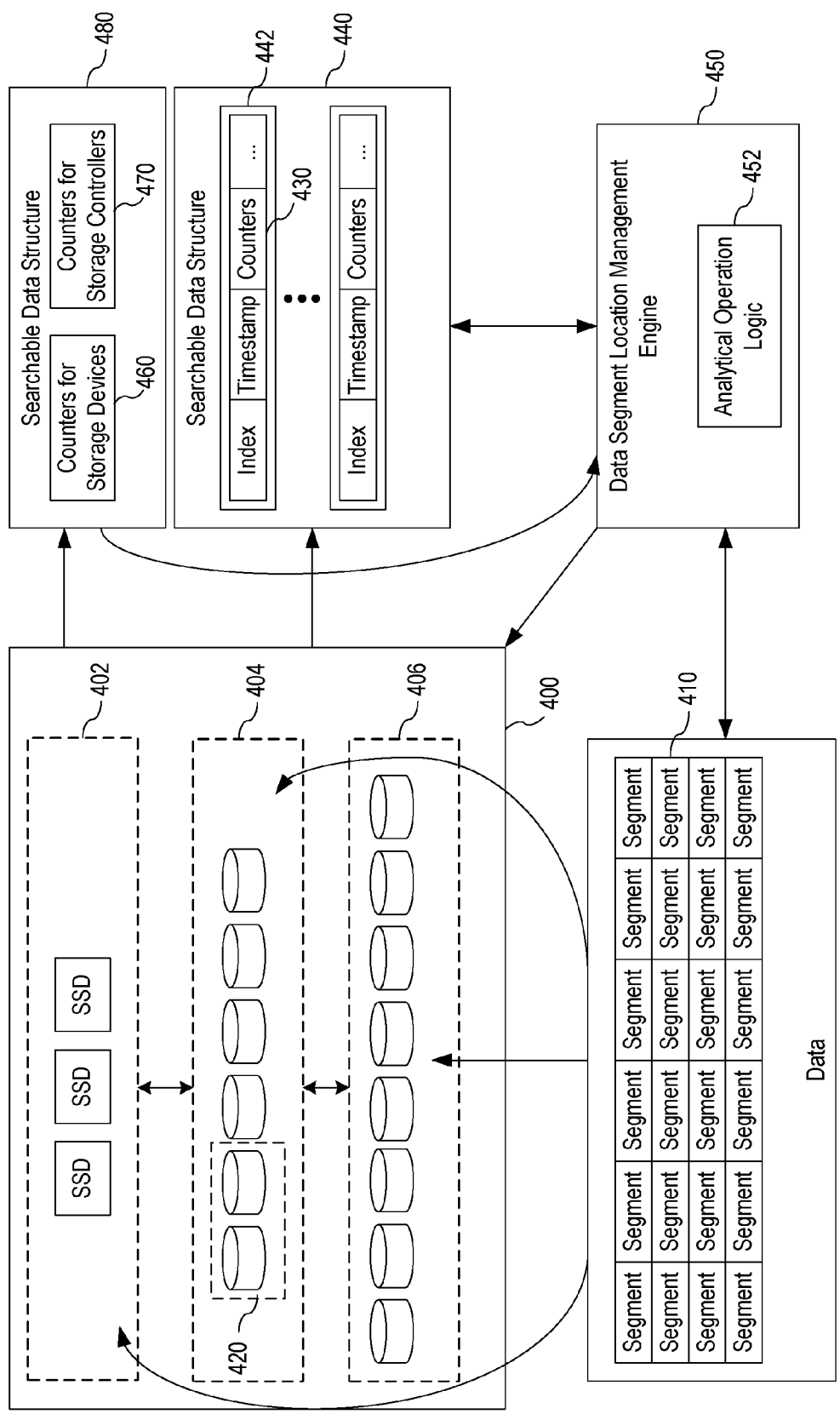
FIG. 4 is an example logical diagram of a tiered storage system in accordance with an alternative embodiment in which operations per second measures associated with storage devices and storage controllers are utilized.

In a further illustrative embodiment, as shown in FIG. 4 in which elements 400-450 operate in a similar manner as the corresponding elements 300-350 in FIG. 3 unless otherwise indicated herein, rather than relying solely on counters 430 measuring access operations to data segments 410, additional counters 460 may be provided for each of the storage devices in one or more of the tiers of the tiered storage system, e.g., only the top tier of the storage system, one or more of the highest tiers of the tiered storage system, or for all of the tiers of the tiered storage system, as well as counters 470 for the storage controllers 480 for the various storage devices in the tiers 402-406. These counters 460-470 may measure operations per second in a similar manner as noted above with regard to the counters 430 for the data segments. In addition, a value corresponding to the maximum operations per second for each storage device and controller may be maintained. These counters 460-470 may be stored in a searchable data structure 480 in a similar manner as the counters 430 for the data segments 410.

The data segment location management engine 450 may perform analytical operations similar to that described above with regard to data segment location management engine 350. However, the data segment location management engine 450 may further base such analytical operations on the measures of operations per second for the storage devices and controllers, as determined from the counters 460 and 470. For example, the operations per second measures for the storage devices and controllers may be used in projections of operations per second expected for future time periods, along with operations per second measures for data segments stored on these storage devices, or on which the data segments may be stored in response to a promotion or demotion operation, to determine what the expected operations per second will be at the future time periods. These projections may be used to determine whether or which storage devices and storage controllers are capable of handling the expected operations per second when other policies indicate that a promotion or demotion operation is to be performed.

For example, if a data segment is to be promoted to a particular tier of the tiered storage system due to the application of a promotion policy, the projections may be used to determine if and which storage devices and storage controllers in the tier to which the data segment is to be promoted will have the capacity to handle the operations per second expected for the data segment that is being promoted. If none of the storage devices/controllers are capable of handling the additional operations per second for the data segment, then the data segment location management engine 450 considers whether a demotion of the data segment, or other data segments that have relatively lower access usage in the target tier, to a lower tier would result in an overall performance enhancement.

It should be noted that while the tier to which the data segment is to be moved may have available storage capacity, this does not necessarily mean that the storage device/controller can handle the operations per second in an efficient manner to warrant or allow the promotion of the data segment to that tier. Thus, with the illustrative embodiments, storage capacity of the storage devices of a tier is not the only factor determining whether a data segment may be moved to that tier or not, but the ability of the storage devices/controllers to handle the additional operations per second and provide a desired level of performance, or data availability, is also considered. In this way, the user can also be notified by the data segment location management engine 450, such as via displayed message, activity report, or the like, that providing additional storage devices of a particular tier can provide a performance benefit either all of the time or at particular time periods as determined by the data segment location management engine 450. Moreover, the data segment location management engine 450 may also determine periods of the day, week, month, etc. that the end user may run certain applications in order to make the distribution to the tiers more uniform.

Whether or not the additional operations per second of the data segment can be handled by the storage devices/controllers of the tier may, in one illustrative embodiment, be determined based on a comparison of the projected operations per second (based on the values for the data segments and the storage devices/controllers) and the maximum values associated with the storage devices/controllers. If the maximum values will be exceeded by the addition of the operations per second of the data segments, then the data segment location management engine 450 may determine an alternative promotion/demotion of the data segments.

The projections and maximum values may further be used to determine when data segments should be promoted from lower tiers to higher tiers of the tiered storage system. For example, when a bottom tier's operations per second are reaching a maximum for the tier, then promotion may be made of the data segments having the highest operations per second. The tier to which to move the data segments may be determined based on how best to even out the tiers, whether some data segments that are in higher tiers have operations per second measures that are below those of the data segments being promoted, or the like.

Moreover, the data segment location management engine 450 may further monitor the counter values for the storage devices and controllers to determine if there is significant asymmetry between the tiers of the tiered storage system that warrants a rebalancing of the data segments. For example, if the data segment location management engine 450 detects an asymmetry and some storage devices/controllers of any of the tiers are at maximums or are significantly out of balance, then the data segment location management engine 450 may initiate data segment movement operations as necessary to rebalance the data segment loads on the storage devices/controllers of the tiers and alleviate any bottlenecks that may exist.

The above illustrative embodiments are described as performing comparisons against thresholds to determine whether a data segment should be promoted or demoted. While in some illustrative embodiments these thresholds may be static in nature, the illustrative embodiments are not limited to such. Rather, the thresholds may be initially set to low values and then adjusted as available storage capacity of the tiers reaches predetermined levels. For example, when the available storage capacity, i.e. the amount of available free space in the storage devices, of a tier reaches a first predetermined level, the thresholds may be adjusted so as to increase the required operations per second before a data segment may be promoted to the tier as well as increase the operations per second below which demotion may be performed. This essentially makes it more difficult for data segments to be moved into the tier and easier for data segments to be moved from the tier into lower tiers. Such adjustments may be made dynamically as the storage capacity of the tier increases/decreases over time thereby making it increasingly difficult to move data segments into the tier as the available storage capacity of the tier decreases. Using this dynamic approach, thresholds may be adjusted so as to promote keeping the tiers as balanced as possible.

Figure 5:
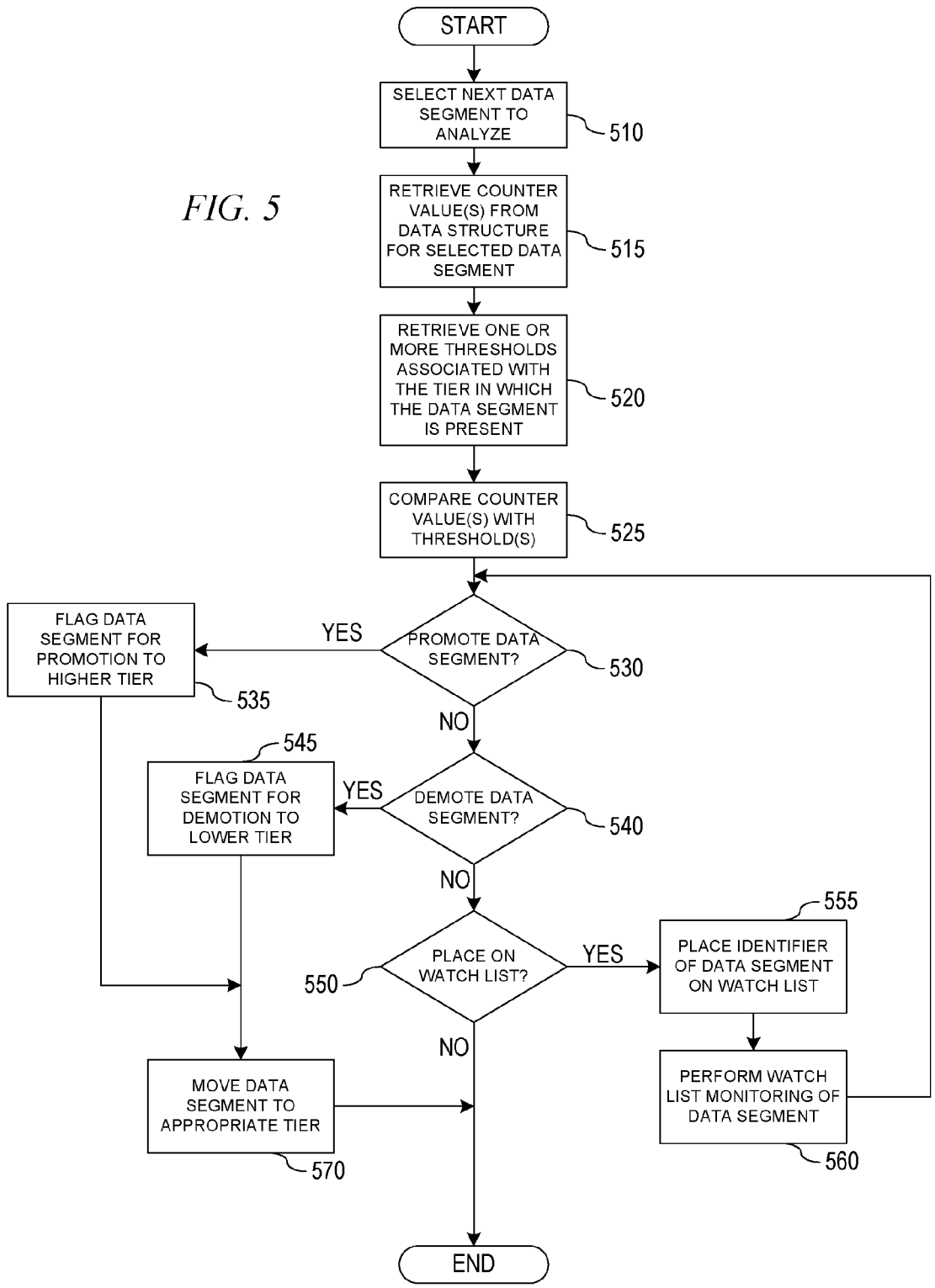
FIG. 5 is a flowchart outlining an operation for promoting/demoting a data segment within a tiered storage system based on access densities of the data segment.

FIG. 5 is a flowchart outlining an operation for promoting/demoting a data segment within a tiered storage system based on access densities of the data segment. The operation outlined in FIG. 5 may be performed, for example, by a data segment location management engine associated with a tiered storage system. The operation may be performed as a background operation such that the data segments of the tiered storage system may continue to be accessed while the data segment location management engine determines whether to promote/demote data segments and initiate movement of data segments between tiers of the tiered storage system. As such, the background operation may be performed in a continual manner, at periodic intervals, at the end of a monitoring period, or the like. The operation shown in FIG. 5 assumes that the operation is initiated by the occurrence of an event, such as initialization of the tiered storage system in the case of continual monitoring by the background operation, the elapse of the periodic interval, or the end of the monitoring period, for example.

As shown in FIG. 5, the operation starts by selecting a next data segment in the tiered storage system for analysis (step 510). One or more counter values for the data segment are retrieved from a counter value storage data structure (step 515). One or more threshold values for the tier in which the data segment currently resides are retrieved (step 520). The one or more counter values are then compared with the one or more thresholds (step 525). Based on the results of the comparison, a determination is made as to whether the data segment should be promoted to a higher tier in the tiered storage system (step 530). If so, then the data segment may be flagged, such as by setting a flag bit in metadata associated with the data segment, for promotion to a higher tier (step 535).

If the data segment is not to be promoted based on the results of the comparison in step 525, then a determination is made as to whether the data segment should be demoted based on the results of the comparison (step 540). If the results of the comparison indicate that the data segment should be demoted, then the data segment is flagged for demotion to a lower tier (step 545). If the results of the comparison do not indicate that the data segment should be demoted, a determination is made as to whether the data segment should be placed on a watch list (step 550). For example, this determination may involve determining whether the counter values are within a predetermined tolerance of the thresholds which is indicative of the data segment needing to be watched more closely for possible promotion/demotion.

If the data segment is to be placed on a watch list, an identifier of the data segment is added to a watch list (step 555) and watch list monitoring of the data segment 560 is performed (step 560). The watch list monitoring of the data segment may involve performing similar comparisons of counter values for subsequent time intervals to the thresholds on a more frequent basis to determine if promotion/demotion is in order, for example. Thus, the operation returns to step 530 where such promotion/demotion determinations are made based on the comparisons performed as part of the watch list monitoring.

If the data segment is flagged for promotion (step 535) or demotion (step 545), at a later time the data segment may be moved to an appropriate tier of the tiered storage system. For example, the data segment may be moved to a next higher tier or next lower tier in the tiered storage system. Alternatively, the flags may identify a tier to which the data segment is to be moved such that data segments may be moved across multiple tiers, e.g., from a lowest tier to a highest tier. The actual movement of the data segments may be scheduled for a time of relatively low access requests being received for data in the tiered storage system, e.g., midnight, or for a time at which the particular data segment is determined to not have any pending access requests such that it may be moved without interfering with the availability of the data segment. Once the data segment is moved, or after a determination that the data segment is not to be promoted, demoted, or placed on a watch list, the operation terminates. The operation shown in FIG. 5 may be repeated for each data segment being monitored.

Figure 6:
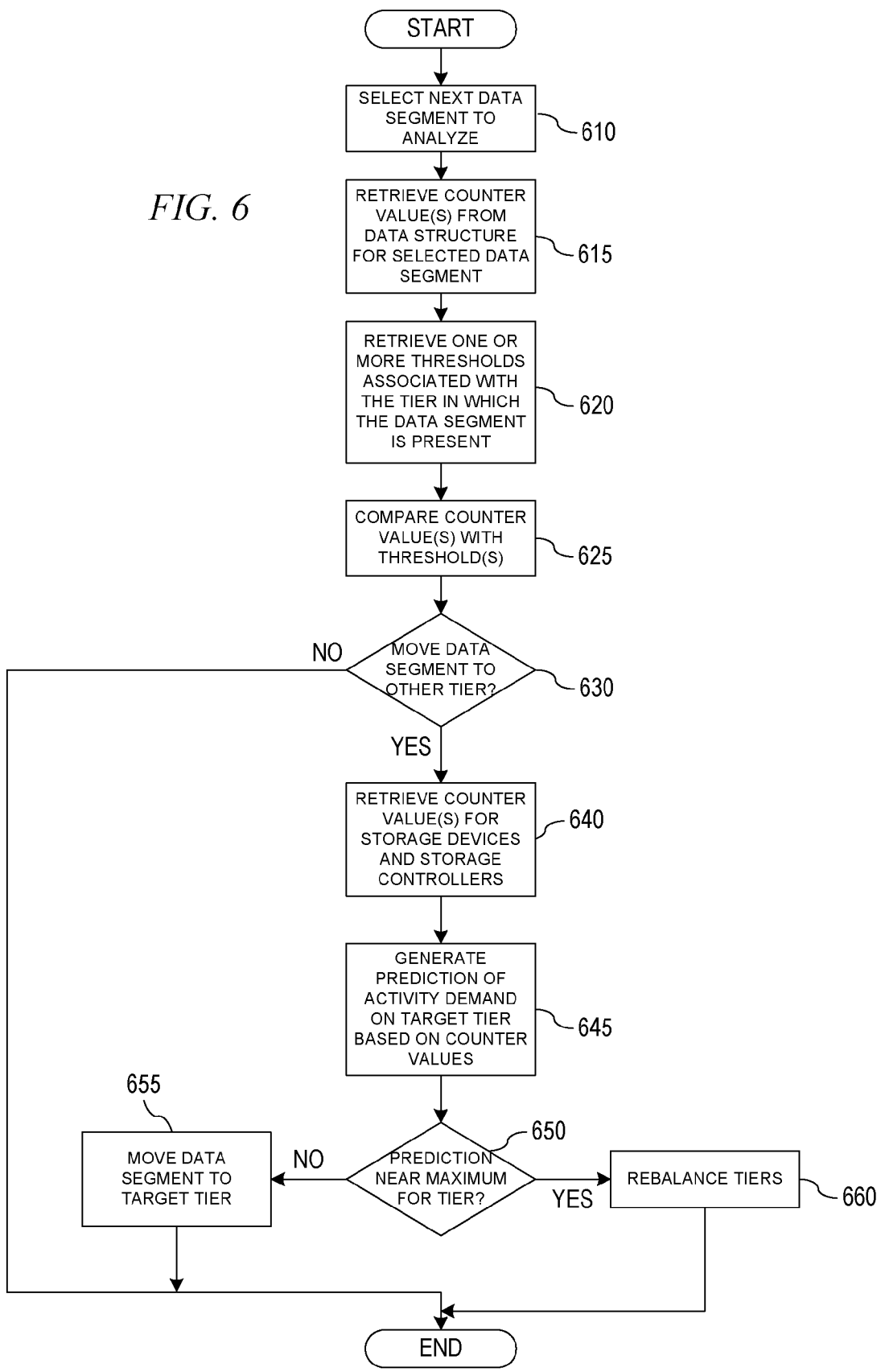
FIG. 6 is a flowchart outlining an operation for utilizing projected workloads to determine a proper location for a data segment within a tiered storage system in accordance with one illustrative embodiment.

FIG. 6 is a flowchart outlining an operation for utilizing projected workloads to determine a proper location for a data segment within a tiered storage system in accordance with one illustrative embodiment. As shown in FIG. 6, the operation starts by selecting a next data segment in the tiered storage system for analysis (step 610). One or more counter values for the data segment are retrieved from a counter value storage data structure (step 615). One or more threshold values for the tier in which the data segment currently resides are retrieved (step 620). The one or more counter values are then compared with the one or more thresholds (step 625). Based on the results of the comparison, a determination is made as to whether the data segment should be moved to another tier in the tiered storage system (step 630). If not, the operation terminates.

If so, then counter values for storage devices and storage controllers of the target tier, i.e. the tier to which the data segment is to be moved, are retrieved (step 640). A prediction of the activity demand on the target tier is generated based on the counter values associated with the data segment, the storage devices, and the storage controllers (step 645). A determination is made as to whether the prediction is near a maximum value for the tier, i.e. within a given tolerance of a maximum activity demand value for the tier (step 650). If not, then the data segment is moved to an appropriate storage device, i.e. one having sufficient available capacity and activity demand on both the storage device and its associated storage controller, in the target tier (step 655). If the prediction is near a maximum value, then a plurality of tiers in the tiered storage system undergo a rebalancing operation to rebalance the activity demands of the tiers such that the data segment may be moved to an appropriate tier (step 660). The operation then terminates. Again, this operation may be performed repeatedly for each data segment being monitored.

Figure 7:
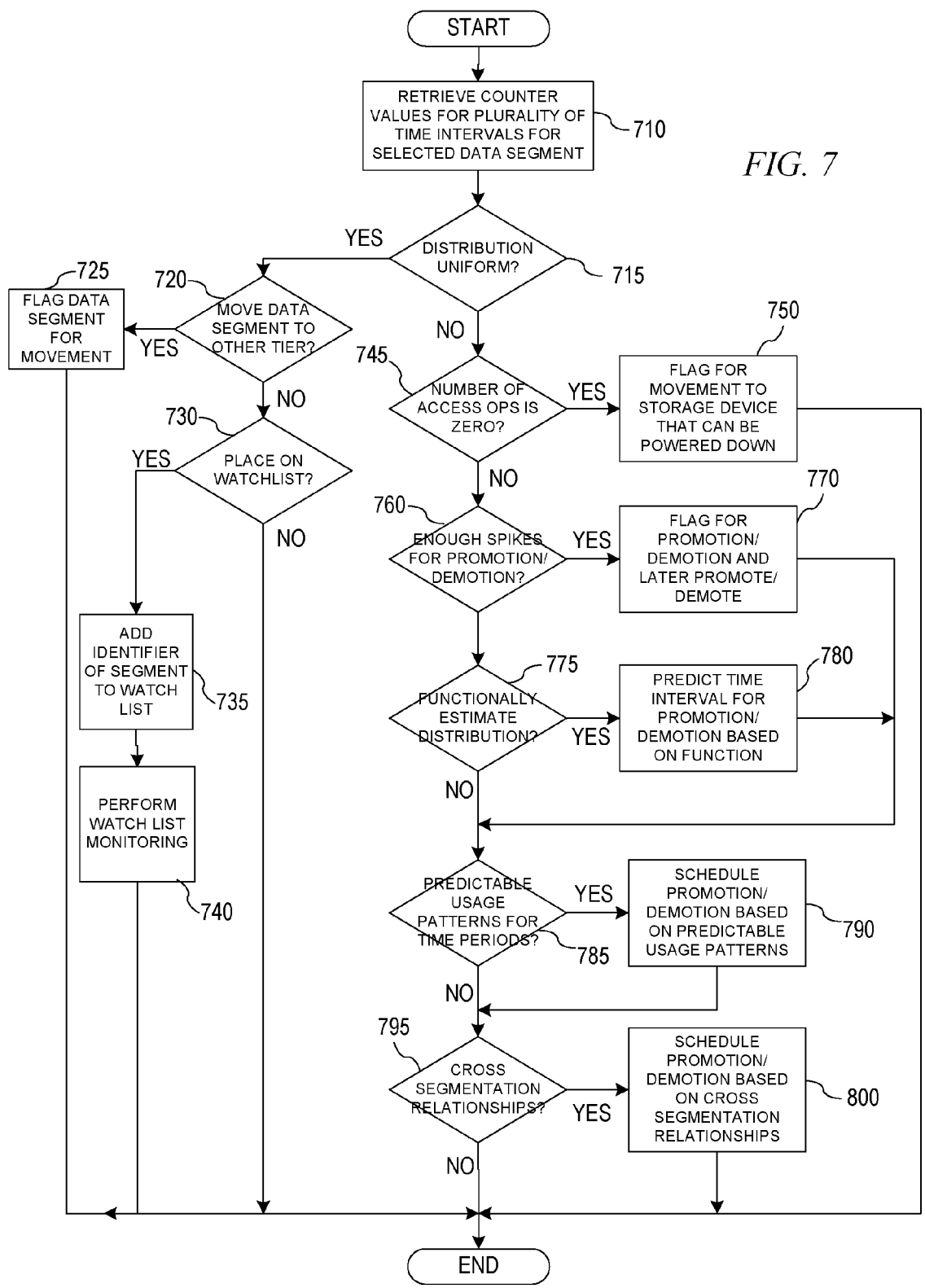
FIG. 7 is a flowchart outlining an operation for utilizing a searchable data structure to perform background analytical operations in accordance with one illustrative embodiment.

FIG. 7 is a flowchart outlining an operation for utilizing a searchable data structure to perform background analytical operations in accordance with one illustrative embodiment. As shown in FIG. 7, the operation starts by retrieving the counter values, from a searchable data structure such as the Btree discussed above, for a plurality of time intervals for a currently selected data segment (step 710). A determination is made as to whether a distribution of the counter values is uniform (step 715). If the distribution is uniform, a representation of the counter values, e.g., an average of the counter values, is compared to a retrieved threshold for the current tier to determine if the data segment should be moved to another tier (step 720). If the data segment is to be moved to another tier, then the data segment is flagged appropriately for promotion/demotion (step 725). If the data segment is not to be moved, then a determination is made as to whether the data segment should be placed on a watch list for possible promotion/demotion (step 730). If the data segment is to be placed on a watch list, an identifier of the data segment is added to a watch list (step 735) and watch list monitoring of the data segment is performed in a similar manner as discussed above with regard to FIG. 5 (step 740).

If the distribution of the counter values is not uniform, a determination is made as to whether the number of access operations during the plurality of time intervals is zero (step 745). If so, the data segment is flagged for movement to a storage device that can be powered down over long periods of time (step 750). If the number of access is not zero, a determination is made as to whether the distribution has enough spikes either above or below a threshold for the tier to promote/demote the data segment (step 760). If so, the data segment is flagged for promotion/demotion and later promoted/demoted to an appropriate tier in the tiered storage system, depending upon whether the spikes are above or below the threshold (step 770).

If the data segment does not have enough spikes for promotion/demotion, a determination is made as to whether the distribution may be functionally estimated, e.g., by way of a linear increasing/decreasing slope, exponentially increasing/decreasing curve, or the like (step 775). If so, functional representation is used to predict a time interval at which the count value will meet/exceed/fall below the threshold and promotion/demotion of the data segment is scheduled based on the predicted time interval (step 780).

Thereafter, a determination is made as to whether the distribution has usage patterns indicative of predictable time periods at which the data segment should be promoted/demoted (step 785). If so, the promotion/demotion of the data segment is scheduled based on the usage pattern of predictable time periods (step 790). A determination is also made as to whether there are predictable cross segmentation relationships between the data segment and one or more other data segments (step 795). If so, the promotion/demotion of the data segment is scheduled based on these identified cross segmentation relationships (step 800). The operation then terminates.

Thus, the illustrative embodiments provide a mechanism by which the residency of data segments within a tiered storage system may be automatically determined and dynamically modified so as to achieve optimum performance of the tiered storage system. The mechanisms of the illustrative embodiments monitor the access density, e.g., operations per second, associated with data segments, storage devices, and storage controllers to identify which data segments need to be moved from one tier to another within the tiered storage system and predict when to make such movements. Moreover, the mechanisms of the illustrative embodiments allow policies to be automatically generated for future movements of data segments based on detected usage patterns and cross segmentation relationships. As a result, an automated mechanism is provided for managing a tiered storage system that greatly reduces the need for manual intervention by a system administrator.

While the above illustrative embodiments utilize a plurality of counters associated with each data segment, e.g., one for each time interval, the illustrative embodiments are not limited to such. Rather, the use of the plurality of counters facilitates a greater range and more complex analysis using trends, predictions, and the like. In other illustrative embodiments, a single counter can be used with each segment, the counter being stored in a data structure in a similar manner as described above. This single counter may be used to generate a weighted access rate that is biased toward recent activity on the data segment. In addition, a weighted access rate for a previous time interval may be maintained in this data structure associated with the data segment for use in determining a weighted access rate for the current time interval.

For example, a data segment may have a single counter that provides a count indicative of an access rate for the current time interval, e.g., the most recent 30 minutes. The weighted access rate for a previous time interval may be combined, through a pre-determined function or operation, with the counter value to determine a current weighted access rate for the current time interval. This current weighted access rate may then be compared to one or more pre-established thresholds to determine whether the data segment is to be promoted, demoted, or left in the current tier of the storage system.

As one example, the weighted access rate may be determined by a function such as $Anew=W*I+(1-W)*A$, where Anew is the current weighted access rate for the current time interval, I is the counter value for the current time interval, W is a predetermined weighting factor (e.g., 0.75 or the like), and A is the weighted access rate from the previous time interval. Thus, for example, if W is 0.75, then $Anew=0.75I+0.25A$. Of course other functions or operations for determining a weighted access rate for the current time interval can be used without departing from the spirit and scope of the illustrative embodiments. For example, instead of using the weighted access rate for a previous time interval (A), an average of the weighted access rates for a predetermined number of previous time intervals may be used, a maximum weighted access rate from a predetermined number of previous time intervals may be used, or any other measure of access rates for this data segment may be used instead of the weighted access rate for the previous time interval (A). Moreover, other combinations of counter values, access rate values, and weighting functions may be used without departing from the spirit and scope of the illustrative embodiments.

In other illustrative embodiments, the data structures storing the counter value(s) for the data segments may store additional information to aid in performing more complex analysis. For example, the data structures may store information in appropriate fields to identify if a particular data segment is locked to a given tier, if there is a manual movement policy to follow for the associated data segment, how many times the data segment has been moved in a predetermined time period, the access rate of the data segment when it was last in the highest tier of the storage system, a first timestamp reference for when the data segment was first accessed, a number of times the data segment has been accessed since the first time stamp, and the like. Such information permits more complex analysis, such as determining if a data segment, which otherwise would be moved based on the operations described above, should remain in a current tier of the storage system because the data segment has been locked to the tier, has a manual movement policy associated with it, or has been moved more than a predetermined number of times within a predetermined time period of the current time. Moreover, such analysis may involve looking at the access rate for the data segment when it was last in the highest tier, and determining if that access rate does not meet a predetermined criteria. In such a case, the data segment is moved to a next lower tier or is not moved at all. Other more detailed and complex analysis may be performed using such information stored in the data structures associated with the data segments without departing from the spirit and scope of the illustrative embodiments.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for managing data segments in a tiered storage system, comprising:
    maintaining, in the data processing system, at least one counter for each data segment in the tiered storage system, wherein each counter in the at least one counter counts a number of access operations to a corresponding data segment for a predetermined time interval;
    performing, by the data processing system, one or more analytical operations based on one or more values of the at least one counter for each data segment to make residence determinations for each data segment; and
    adjusting, in the tiered storage system, a storage location of one or more data segments in tiers of the tiered storage system to thereby move the one or more data segments to appropriate tiers of the tiered storage system based on results of the one or more analytical operations, wherein performing the one or more analytical operations comprises:
    determining a plurality of access rates for a data segment based on values of the at least one counter associated with the data segment;
    determining if a distribution of the plurality of access rates is uniform; and
    in response to determining that the distribution of the plurality of access rates is not uniform, comparing a most recent access rate of the plurality of access rates, or an average of the plurality of access rates, with one or more predetermined thresholds indicative of whether to promote or demote the data segment from a current tier of the tiered storage system to another of the tiers in the tiered storage system.

2. The method of claim 1, wherein the at least one counter for each data segment comprises a plurality of counters for each data segment, each counter being associated with a different associated time interval and measuring a number of accesses to the data segment during an associated time interval.

3. The method of claim 1, wherein adjusting a storage location of one or more data segments in tiers of the tiered storage system comprises moving a data segment from a lower tier of the tiered storage system to a higher tier of the tiered storage system in response to one or more of counter values associated with the data segment meeting a first predetermined criteria.

4. The method of claim 1, wherein adjusting the storage location of one or more data segments in tiers of the tiered storage system comprises moving a data segment from a higher tier of the tiered storage system to a lower tier of the tiered storage system in response to one or more of counter values associated with the data segment meeting a second predetermined criteria.

5. The method of claim 3, wherein the higher tier comprises one or more storage devices having relatively higher performance characteristics than storage devices in lower tiers of the tiered storage system.

6. The method of claim 1, wherein the at least one counter comprises, for each data segment, at least one separate counter for read operations and at least one separate counter for write operations.

7. The method of claim 1, wherein the one or more analytical operations comprises performing a prediction operation to determine a time in the future when a corresponding data segment is predicted to need to be moved from a current tier in the tiered storage system to another tier in the tiered storage system, and wherein the one or more data segment storage policies cause the corresponding data segment to be moved at a time prior to the time in the future when the corresponding data segment is predicted to need to be moved.

8. The method of claim 7, wherein performing a prediction operation to determine a time in the future when a corresponding data segment is predicted to need to be moved from a current tier in the tiered storage system to another tier in the tiered storage system, further comprises predicting a time interval at which a counter value of the at least one counter will have a specified relationship relative to a counter threshold indicating a point in time for either promotion or demotion of the data segment to the another tier in the tiered storage system.

9. The method of claim 1, wherein the one or more predetermined thresholds are specific to the current tier of the tiered storage system, and wherein at least one other tier in the tiered storage system has at least one different predetermined threshold.

10. The method of claim 9, wherein if the comparison of the access rate, or an average of the plurality of access rates, to the one or more predetermined thresholds results in a determination that the data segment is not to be moved to another tier in the tiered storage system, but the access rate, or an average of the plurality of access rates, is within a predetermined tolerance of a threshold in the one or more thresholds, then an identifier of the data segment is placed on a watch list data structure, wherein data segments having identifiers on the watch list data structure are checked on a more frequent basis for movement of the data segment to another tier of the tiered storage system.

11. The method of claim 1, wherein the one or more analytical operations comprises:
determining if there are any data segments that have zero accesses within a predetermined time period; and
placing identifiers of data segments having zero accesses within the predetermined time period on a zero access watch list for possible movement to an archival storage device, wherein if there are subsequent time periods with zero accesses for these data segments having identifiers on the zero access watch list, the data segments are moved to the archival storage device.

12. The method of claim 1, wherein the one or more analytical operations further comprises,
in response to determining that the distribution of the plurality of access rates is not uniform:
determining a number of spikes in access rate that exceed or fall below one or more predetermined thresholds associated with the data segment;
determining if the number of spikes exceeds a number of spikes threshold value; and
flagging the data segment for movement to another tie n the tiered storage system if the number of spikes exceeds the number of spikes threshold value.

13. The method of claim 1, wherein the one or more analytical operations further comprises,
in response to determining that the distribution of the plurality of access rates is not uniform:
determining a trend of the plurality of access rates for the data segment as having at least one of a substantially linearly increasing or decreasing trend, an exponentially increasing or decreasing trend, or other non-linear trend that may be formulated such that a prediction or extrapolation of access rates for future time intervals may be calculated;
predicting a point in time at which an access rate for the data segment will meet or exceed a first predetermined threshold for promotion of the data segment or meet or fall below a second predetermined threshold for demotion of the data segment based on the determined trend; and
flagging the data segment for movement of e data segment to another tier of the tiered storage system at the predicted point in time.

14. The method of claim 1, wherein the one or more analytical operations further comprises, in response to determining that the distribution is not uniform:
analyzing the plurality of access rates to identify one or more time trends with regard to at least one of times of day, times of the week, quarterly trends, monthly trends, or yearly trends; and
generating a policy for movement of the data segment based on the identified one or more time trends.

15. A method. in a data processing system, for managing data segments in a tiered storage system, comprising:
maintaining, in the data processing system, at least one counter for each data segment in the tiered storage system, wherein each counter in the at least one counter counts a number of access operations to a corresponding data segment for a predetermined time interval;
performing, by the data processing system, one or more analytical operations based on one or more values of the at least one counter for each data segment to make residence determinations for each data segment; and
adjusting, in the tiered storage system, a storage location of one or more data segments in tiers of the tiered storage system to thereby move the one or more data segments to appropriate tiers of the tiered storage system based on results of the one or more analytical operations, wherein the one or more analytical operations comprises cross data segment spike analytical operations to determine a cross data segment usage pattern relationship between a first data segment and a second data segment, wherein a spike in usage of the first data segment has a correlated spike in usage of the second data segment.

16. The method of claim 15, further comprising automatically generating and storing, by the data processing system, one or more data segment storage policies to be automatically implemented within the tiered storage system for future data segment storage operations, based on results of the one or more analytical operations; and
automatically applying, by the tiered storage system, the one or more data segment storage policies to at least one future data segment storage operation in response to the at least one future data segment storage operation having a condition meeting a requirement of the one or more data segment storage policies, wherein automatically generating and storing one or more data segment storage policies comprises generating a policy that causes a movement of the second data segment in response to a detection of a spike in usage of the first data segment.

17. The method of claim 15, wherein automatically generating and storing one or more data segment storage policies comprises generating one of a time dependent policy to cause movement of at least one of the first data segment or the second data segment in response to a current time meeting a time criteria of the time dependent policy, or a time independent policy to cause movement of at least one of the first data segment or the second data segment in response to a spike in usage of one of the first data segment or the second data segment, regardless of a current time.

18. The method of claim 15, wherein at least one of the spike in usage of the first data segment and the spike in usage of the second data segment is a negative spike representing a reduction in usage.

19. A computer program product comprising a non-transitory computer recordable medium having a computer readable program recorded thereon, wherein the computer readable program, when executed on a computing device, causes the computing device to:
maintain at least one counter for each data segment in a tiered storage system, wherein each counter in the at least one counter counts a number of access operations to a corresponding data segment for a predetermined time interval;
perform one or more analytical operations based on one or more values of the at least one counter for each data segment to make residence determinations for each data segment; and
adjust a storage location of one or more data segments in tiers of the tiered storage system to thereby move the one or more data segments to appropriate tiers of the tiered storage system based on results of the one or more analytical operations,
wherein performing the one or more analytical operations comprises:
determining a plurality of access rates for a data segment based on values of the at least one counter associated with the data segment;
determining if a distribution of the plurality of access rates is uniform; and
in response to determining that the distribution of the plurality of access rates is not uniform, comparing a most recent access rate of the plurality of access rates, or an average of the plurality of access rates, with one or more predetermined thresholds indicative of whether to promote or demote the data segment from a current tier of the tiered storage system to another of the tiers in the tiered storage system.

20. An apparatus, comprising:
a processor; and
a memory coupled to the processor, wherein the memory comprises instructions which, when executed by the processor, cause the processor to:
maintain at least one counter for each data segment in a tiered storage system, wherein each counter in the at least one counter counts a number of access operations to a corresponding data segment for a predetermined time interval;
perform one or more analytical operations based on one or more values of the at least one counter for each data segment to make residence determinations for each data segment; and
adjust a storage location of one or more data segments in tiers of the tiered storage system to thereby move the one or more data segments to appropriate tiers of the tiered storage system based on results of the one or more analytical operations,
wherein performing the one or more analytical operations comprises:
determining a plurality of access rates for a data segment based on values of the at least one counter associated with the data segment;
determining if a distribution of the plurality of access rates is uniform; and
in response to determining that the distribution of the plurality of access rates is not uniform, comparing a most recent access rate of the plurality of access rates, or an average of the plurality of access rates, with one or more predetermined thresholds indicative of whether to promote or demote the data segment from a current tier of the tiered storage system to another of the tiers in the tiered storage system.

* * * * *